(12) United States Patent
Brodie et al.

(10) Patent No.: US 6,665,612 B1
(45) Date of Patent: Dec. 16, 2003

(54) NAVIGATION PROCESSING FOR A SATELLITE POSITIONING SYSTEM RECEIVER

(75) Inventors: Keith Jacob Brodie, Irvine, CA (US); David Allan Tuck, El Segundo, CA (US); Mangesh M. Chansarkar, Sunnyvale, CA (US)

(73) Assignee: SiRF Technology, Inc., San Jose, CA (US)

( * ) Notice: Subject to any disclaimer, the term of this patent is extended or adjusted under 35 U.S.C. 154(b) by 0 days.

(21) Appl. No.: 09/943,071

(22) Filed: Aug. 29, 2001

Related U.S. Application Data
(60) Provisional application No. 60/228,965, filed on Aug. 29, 2000.

(51) Int. Cl.[7] .............................................. G06F 165/00
(52) U.S. Cl. .................. 701/213; 701/215; 342/357.02; 342/357.03; 702/153
(58) Field of Search ................................. 701/213, 207, 701/214, 215; 342/357.02, 357.03, 357.06, 357.12; 702/153

(56) References Cited

U.S. PATENT DOCUMENTS

| | | | |
|---|---|---|---|
| 5,590,043 A | * | 12/1996 | McBurney .................. 701/207 |
| 5,646,630 A | * | 7/1997 | Sheynblat et al. ..... 342/357.14 |
| 5,899,957 A | * | 5/1999 | Loomis ....................... 701/214 |
| 6,337,657 B1 | * | 1/2002 | Zhodzishsky et al. . 342/357.02 |

\* cited by examiner

Primary Examiner—Thomas G. Black
Assistant Examiner—Arthur D. Donnelly
(74) Attorney, Agent, or Firm—The Eclipse Group

(57) ABSTRACT

A method for navigation processing in a satellite positioning system receiver is disclosed. A method in accordance with the present invention comprises separating the three SATPS satellites into a first pair and a second pair, constructing a primary solution and an alternate solution, wherein the primary solution and the alternate solution satisfy the measurement constraints, computing a Doppler difference estimate for the primary solution and a Doppler difference estimate for the alternate solution, computing Doppler difference residuals for the first pair and the second pair of SATPS satellites, and comparing the Doppler difference residuals for said primary and alternate solutions to determine a valid solution. Typically, the computing of a Doppler difference residuals comprises differencing a measured Doppler difference from an estimated Doppler difference for the first pair and the second pair of SATPS satellites. Typical determination of a valid solution comprises comparing the difference between the Doppler difference residuals to a predetermined number. Usually when the Doppler difference residuals exceed the predetermined number, the alternate solution is selected as the valid solution.

5 Claims, 19 Drawing Sheets

Cross Product–Normal to Plane of Satellites

Cross Product-Normal to Plane of Satellites

Nav Library DGPS Mode Selection
Executed Before Measurement Processing in Each Navigation Cycle.
Assuming Nav DGPS Degraded Timeout = 0

Nav Filter Degraded Modes and Dead Reckoning

Dead-Reckoning Filter Processing Clean-up

Degraded Mode Filter Processing

Nav Library I/O

Nav Library Main nlmain.vsd
nlmain.c
Page 1
07/05/00

Nav Library Main

Nav Library Main

Nav Library Main

Nav Library Main

Nav Library Main

Nav Library Main

State Update

Nav Mode Transitioning

US 6,665,612 B1

NAVIGATION PROCESSING FOR A SATELLITE POSITIONING SYSTEM RECEIVER

CROSS-REFERENCE TO RELATED APPLICATIONS

This application claims priority under 35 U. S. C. §119(e) of U.S. Provisional Patent Application No. 60/228,965, filed Aug. 29, 2000, entitled "NAVIGATION PROCESSING FOR A SATELLITE POSITIONING SYSTEM RECEIVER," by Keith J. Brodie et al., which application is incorporated by reference herein.

BACKGROUND OF THE INVENTION

1. Field of the Invention

The present invention relates in general to receiver operation in satellite positioning systems (SATPS) such as the Global Positioning System (GPS), GLONASS, and the proposed Galileo system, and in particular to navigation processing for a SATPS receiver.

2. Description of the Related Art

Navigation processing for SATPS receivers usually comprises processing pseudoranges and Doppler frequency shift measurements to determine position and velocity of the receiver. However, this approach is sometimes unable to distinguish between alternate (valid and invalid) three-satellite solutions. Examples of such processing techniques are found in U.S. Pat. No. 5,416,712 by Geier, U.S. Pat. No. 5,883,595 by Colley, and U.S. Pat. No. 5,590,043 by McBurney, all of which are incorporated by reference herein.

SUMMARY OF THE INVENTION

To minimize the limitations in the prior art, and to minimize other limitations that will become apparent upon reading and understanding the present specification, the present invention discloses a method and apparatus for navigation processing in a satellite positioning system receiver, including methods and apparatus for generating a least-squares fix, checking the validity of measurements, and processing measurements in a low-power mode which involves repeated on/off cycles of the reference oscillator used to make the measurements.

A method in accordance with the present invention comprises separating the three SATPS satellites into a first pair and a second pair, constructing a primary solution and an alternate solution, wherein the primary solution and the alternate solution satisfy the measurement constraints, computing a Doppler difference estimate for the primary solution and a Doppler difference estimate for the alternate solution, computing Doppler difference residuals for the first pair and the second pair of SATPS satellites, and comparing the Doppler difference residuals for said primary and alternate solutions to determine a valid solution. Typically, the computing of a Doppler difference residuals comprises differencing a measured Doppler difference from an estimated Doppler difference for the first pair and the second pair of SATPS satellites. Typical determination of a valid solution comprises comparing the difference between the Doppler difference residuals to a predetermined number. Usually when the Doppler difference residuals exceed the predetermined number, the alternate solution is selected as the valid solution.

BRIEF DESCRIPTION OF THE DRAWINGS

Referring now to the drawings in which like reference numbers represent corresponding parts throughout.

DETAILED DESCRIPTION OF THE DRAWINGS

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Least-Squares Navigation Fix

Figure 1:
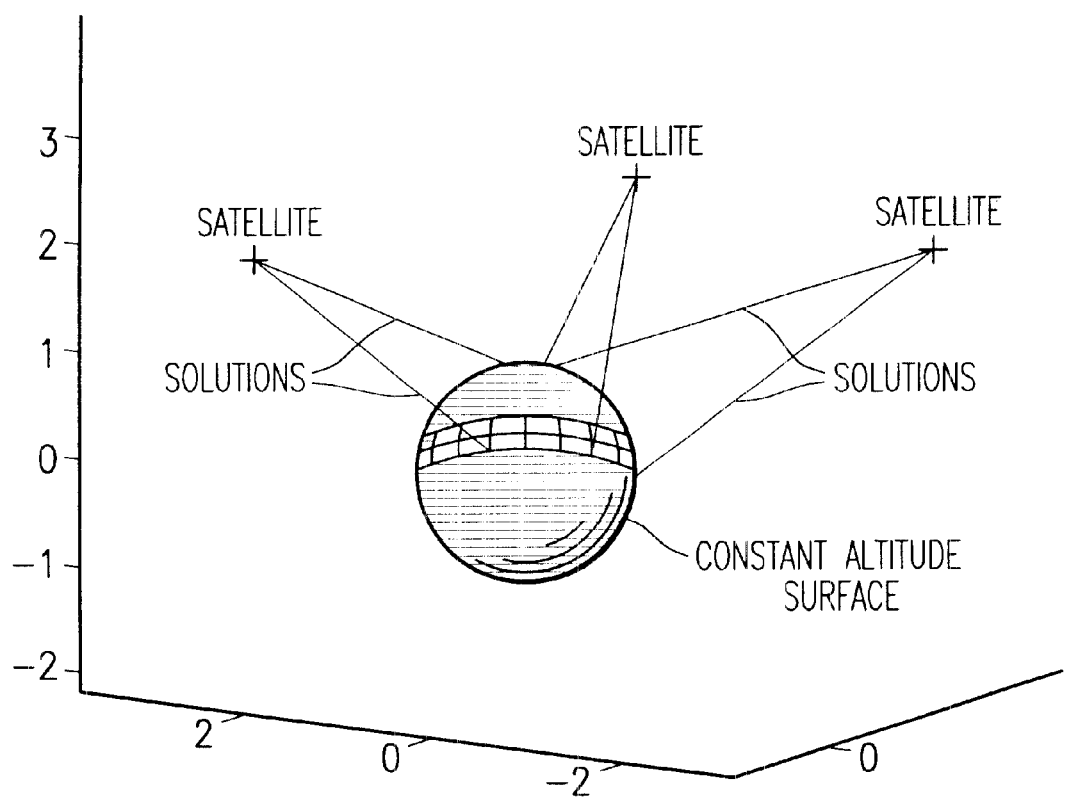
FIG. 1 illustrates the geometry of alternate solutions for a three satellite fix.

A least-squares iterative solution for position and clock bias with four or more satellites is well known. A description of the basic least-squares algorithm for GPS pseudoranges can be found in Understanding GPS: Principles and Applications by E. Kaplan (ed.), Artech House, 1996, pp. 43–47 which is herein incorporated by reference. A three-satellite solution can also be computed by using altitude as a fourth measurement. If the altitude is known it may be used, if not, a default altitude may be assumed for receivers designed for terrestrial use. Altitude may be known from user input or from a saved altitude from a prior period of navigation with more than three satellites. There are usually two solutions to the three-satellite problem. A diagram of the situation is shown in FIG. 1. The sphere is a representation of a constant altitude surface over, or under, the Earth's surface. In other words, every point on the sphere satisfies the altitude constraint. The Earth's surface is not spherical of course, but close enough so that the diagram illustrates one instance of alternate three satellite solutions. The two points identified on the sphere satisfy the pseudorange constraints with different values for user clock bias, or we could say, equivalently, that the difference in the ranges to the satellites is the same for the two alternative fixes.

In order to safely report and use a three satellite least-squares solution, we must be able to determine if the solution we have computed is the correct one from the two possibilities. We have additional data to assist in checking the validity of the solution. The difference in doppler frequencies of the satellites in track observed, versus that predicted from the known satellite orbits and the computed solution is a test on the validity of a computed root. The doppler difference residuals are used to remove the error in the receiver's clock frequency from the test, so the test has finer resolution and is generally applicable under a wider range of circumstances than a test on absolute doppler.

The doppler difference residual is computed by differencing the observed doppler frequencies between two satellites in track. This difference is independent of the frequency error in the SATPS receiver's oscillator by which the received signal's doppler is measure. An estimate of this same doppler difference is made by assuming the SATPS receiver is at the location of a proposed fix, and computing the doppler for the known satellite orbits by computing the dot-product of their earth-fixed frame velocity vectors with the line-of-sight vectors from the fix location to the satellite positions. The doppler difference residual is then the measured difference between doppler frequencies for two satellites minus the estimated difference between dopler frequencies for two satellites. The sum of the absolute value of the doppler differences is then checked against thresholds for reporting and testing alternate roots. The sum of the squared residuals could be used equally well with appropriate changes in the threshold values used to make the reporting and testing decisions.

Unfortunately, the differenced doppler residuals between two alternate roots are not always large enough to guarantee proper root selection. Any velocity of the receiver, in addition, is another unknown in the doppler difference residuals which will limit the ability to decide between roots. In order to safely use one of the roots, the second root should be computed and checked. If intial user velocity is known, or sensor data such as a wheel speed sensor and a compass or heading estimate mantained by a gyro is available, the speed data can be included in the relative velocity computation used for generating the estimates.

Figure 2:
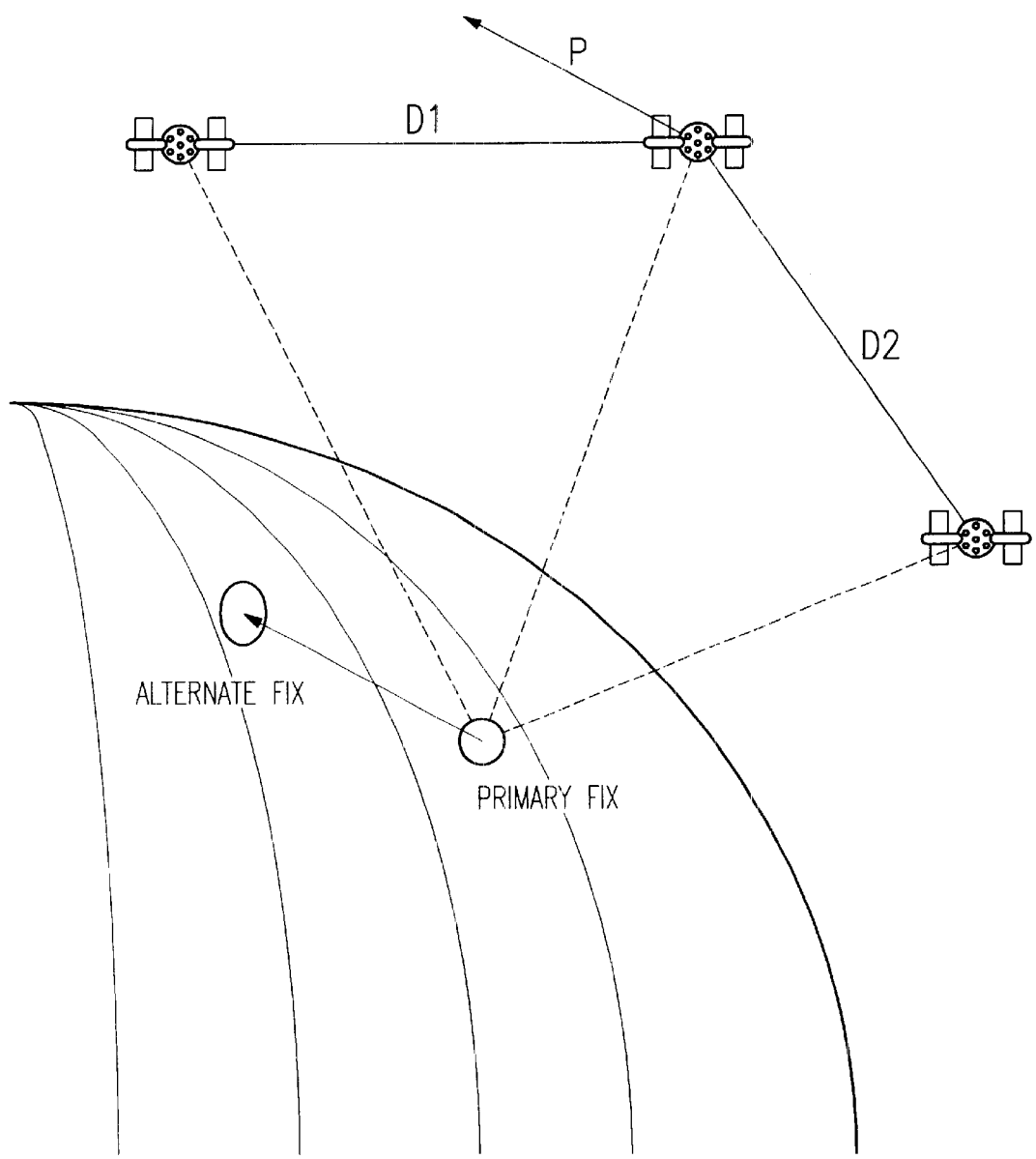
FIG. 2 illustrates the geometry of the projection vector used to compute the initial point for the least-squares iteration for the alternate fix solution.
Figure 3:
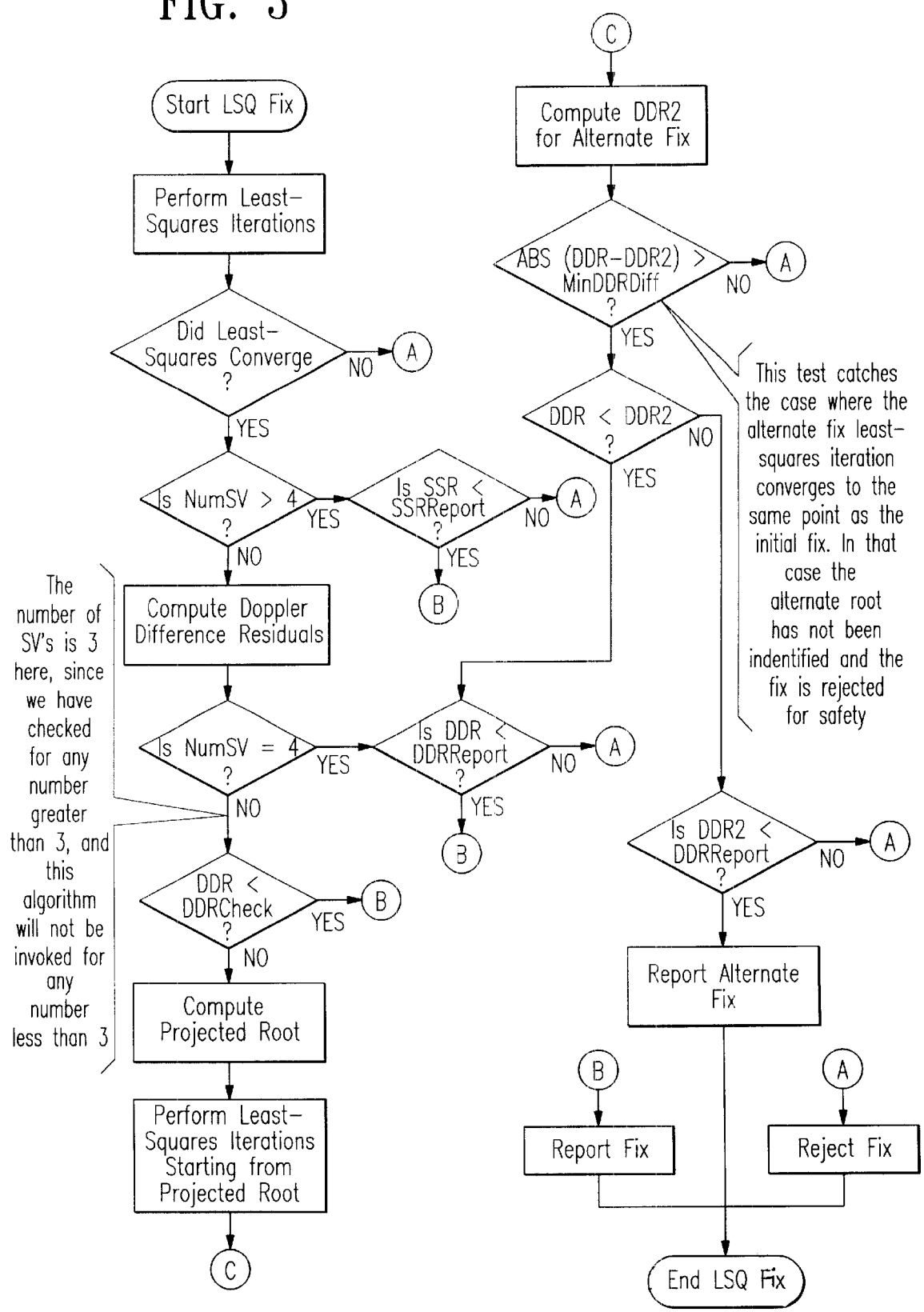
FIG. 3 is the flow chart for the least-squares fix decisions on posting computed fixes and testing for alternate solutions.

A fast method to compute the second root has been found using a projection of the first root through the plane of the satellites. This method results in an approximate location for the second root, which is used to initialize the least-squares iterator so that it will close on the alternate root. The position of the three satellites used in the solution is used to form a plane. A line is drawn normal to this plane and intersecting the first root found on the surface of the constant altitude sphere. This geometric construction is shown in FIG. 2. There are cases where the plane of the satellites does not intersect the sphere, nevertheless there may be two points on the normal to the plane that intersect the sphere. The projection point is computed from the initial root, the position of the satellites, and the radius of the constant altitude sphere using the following method.

$S_1$, $S_2$, $S_3$: Satellite position vectors $R_1$: First root computed from least-squares iterator Satellite position vector differences $D_1 = S_1 - S_2$ $$D_2 = S_2 - S_3$$

Compute a projection vector, normal to the plane defined by the three satellites.

$$P = D_1 \times D_2$$

Compute the unit-normal projection vector.

$$\hat{P} = \frac{P}{|P|}$$

The form of the second, projected root is assumed to be $$R_2 = R_1 + \alpha \hat{P}$$

where $\alpha$ is an unknown constant to be solved for. Since the second root is also required to lie on the constant altitude sphere:

$$|R_2| = |R_1| = |R_1 + \alpha \cdot \hat{P}|$$

This results in a quadratic for $\alpha$ with one non-trivial root:

$$\alpha = -2 R_1 \cdot \hat{P}$$

The projected root is then $$R_2 = R_1 - 2(R_1 \cdot \hat{P}) \hat{P}$$

$R_2$ is then used as the initial position estimate for the least-squares estimator, which will normally close on the alternate root. Occasionally this method may fail to find an alternate root to check. In this case, the three satellite fix is rejected, rather than reporting a fix which may be substantially in error. In some cases, the doppler difference residuals observed at the first root and the alternate root may not differ by a substantial amount. In this case, again lacking clear information to choose, the fix is rejected rather than reporting a fix which may be substantially in error.

Measurement Validity Testing

There are many potential sources of error in SATPS system measurements. These include noise, tropospheric and ionospheric delays, multipath, errors in syncing to the CDMA code used to modulate the satellite transmissions, auto-correlations with the wrong portion of the code, cross-correlations with a different code from another satellite, interfering signals from the local environment or other satellite systems, frequency alias in the tracking loops, and others. Errors such as receiver measurement noise, atmospheric correction errors, errors in the predicted satellite positions are well understood and modeled in the navigation processing. The other errors, such as code-sync errors, multipath, and auto- and cross-correlations are not well modeled, can be very large, and would severely affect navigation processing if measurements affected by these errors are not identified and removed from the set of measurements to be processed. Accordingly, a strong set of validity tests has been developed to insure the integrity of the measurements prior to processing. Those tests can largely be divided into those that depend on reasonable knowledge of the current navigation state, and those that are independent of the state estimate and that can therefore be applied in all conditions, whether prior navigation data exists or not.

Figure 4A:
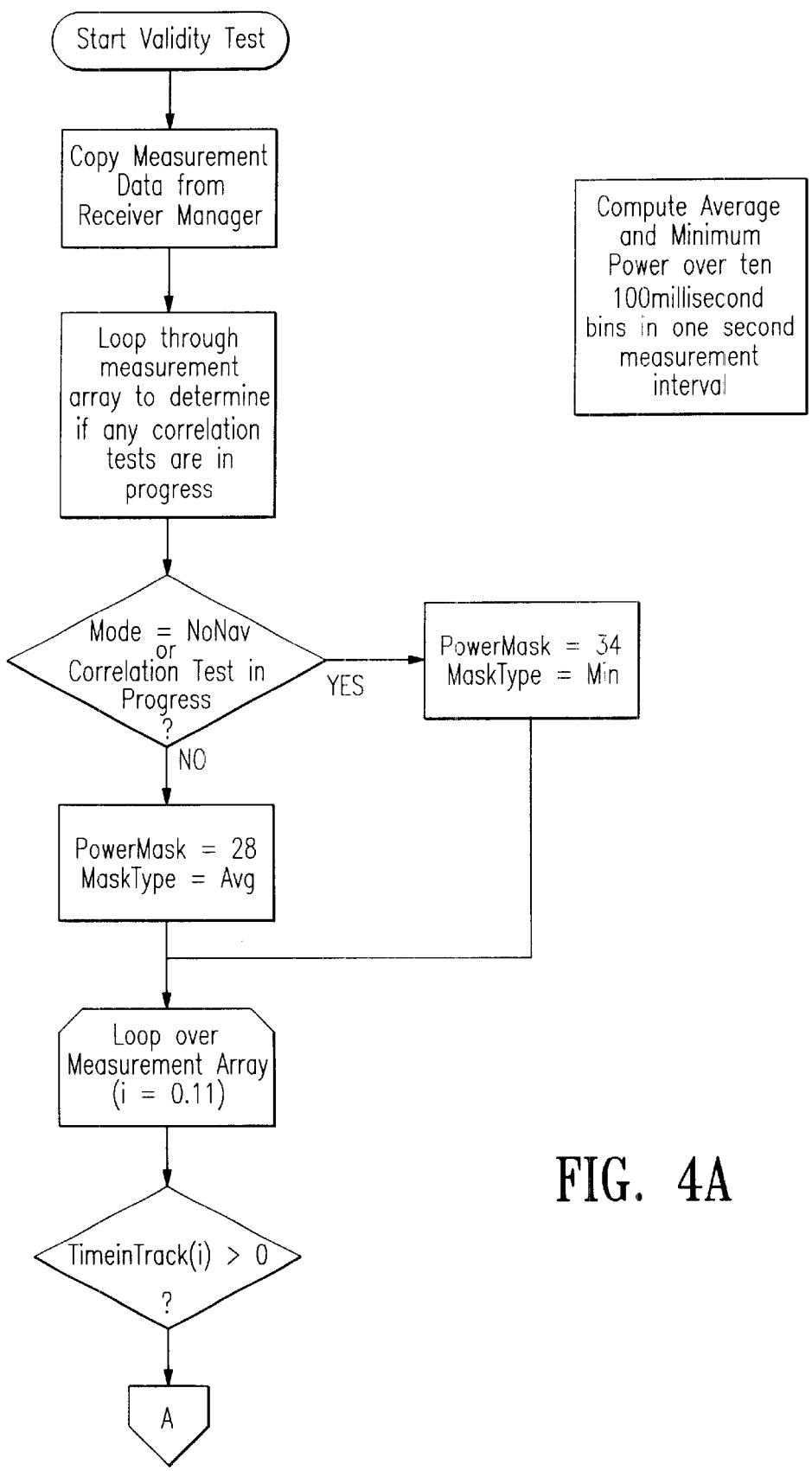
FIGS. 4A and 4B are the flow chart for initial measurement validity checking with an adaptive form of a signal power level test.
Figure 4B:
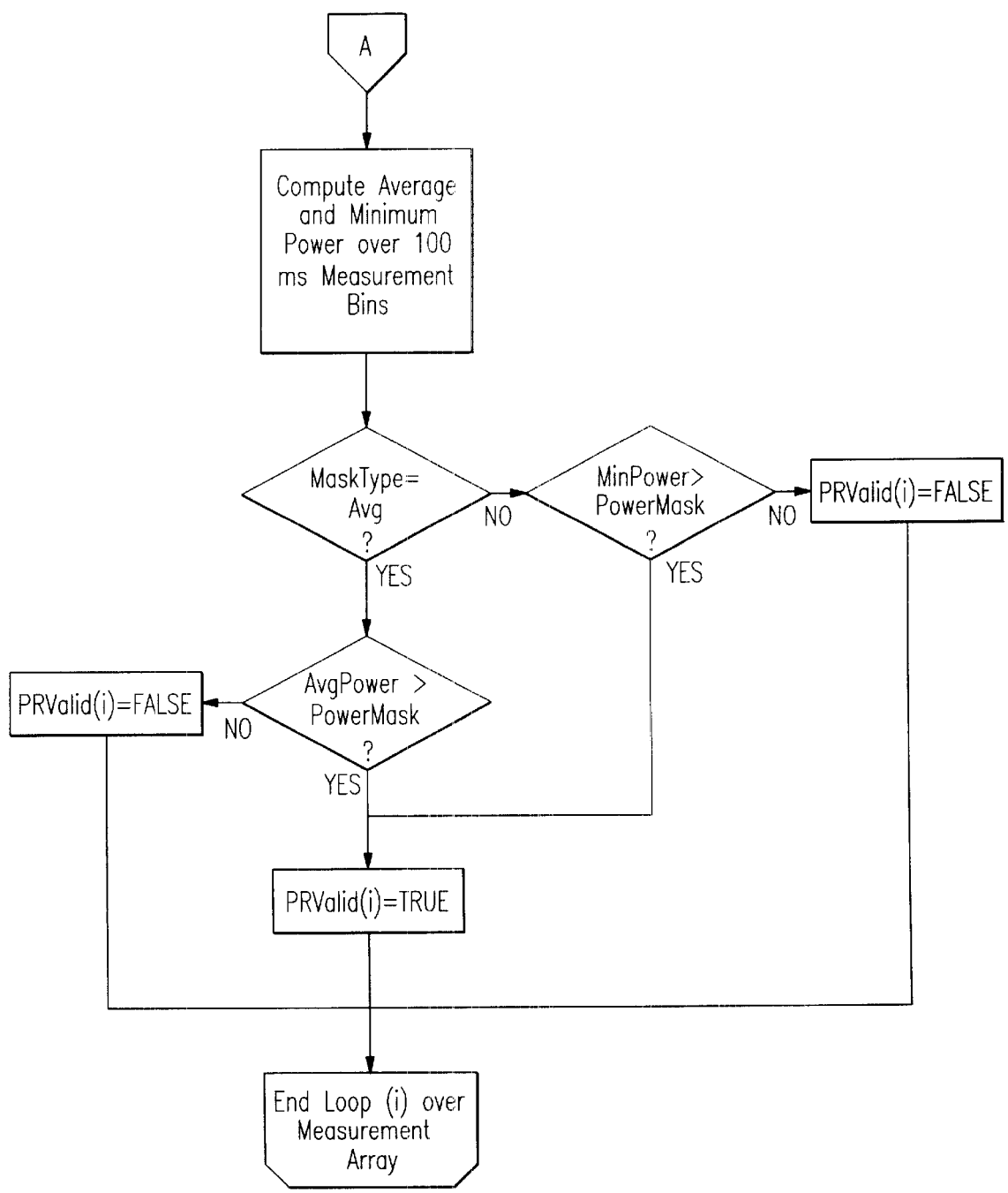
Figure 5:
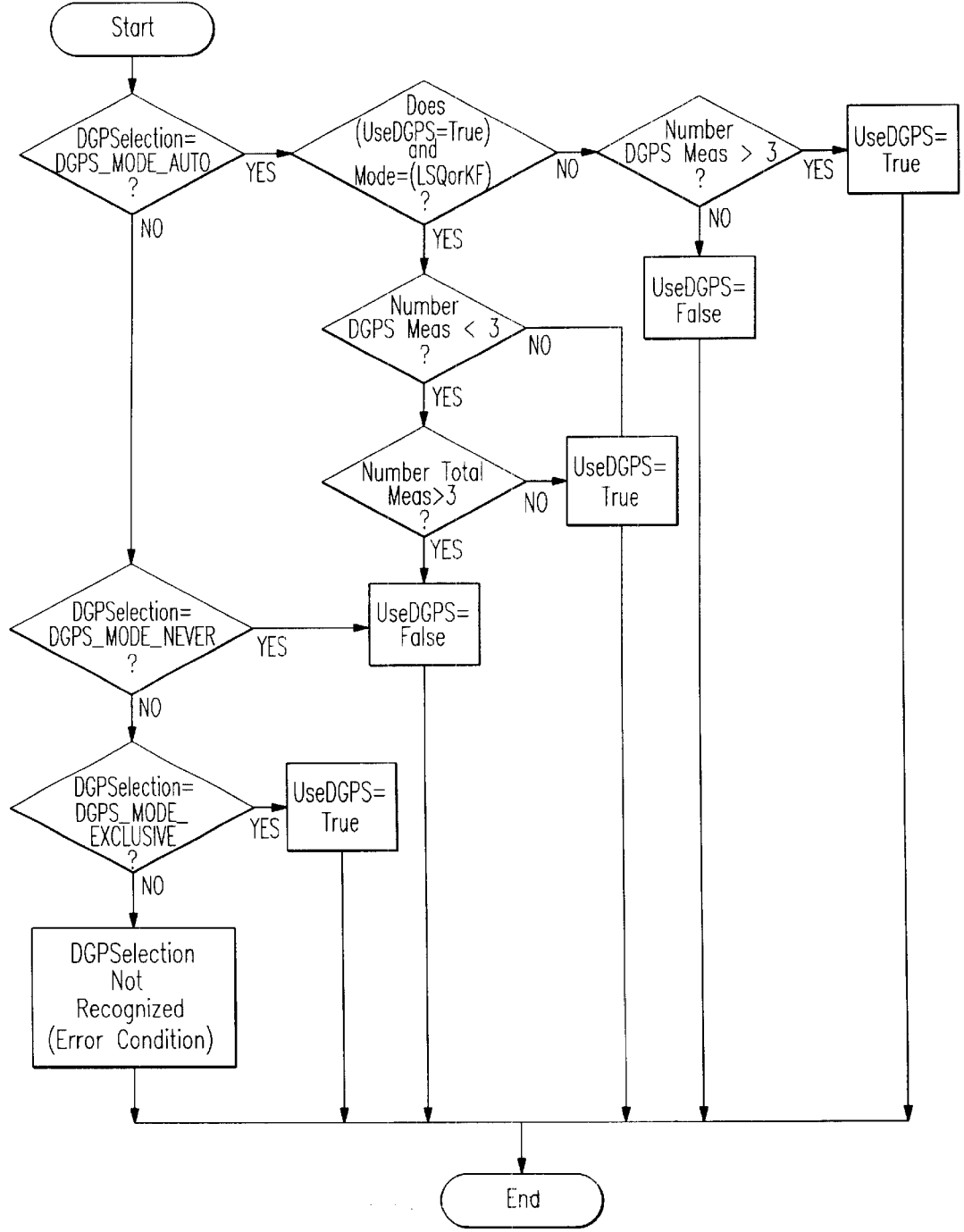
FIG. 5 is the flow chart for the decision to use, or not use DGPS corrections to GPS measurements.
Figure 6A:
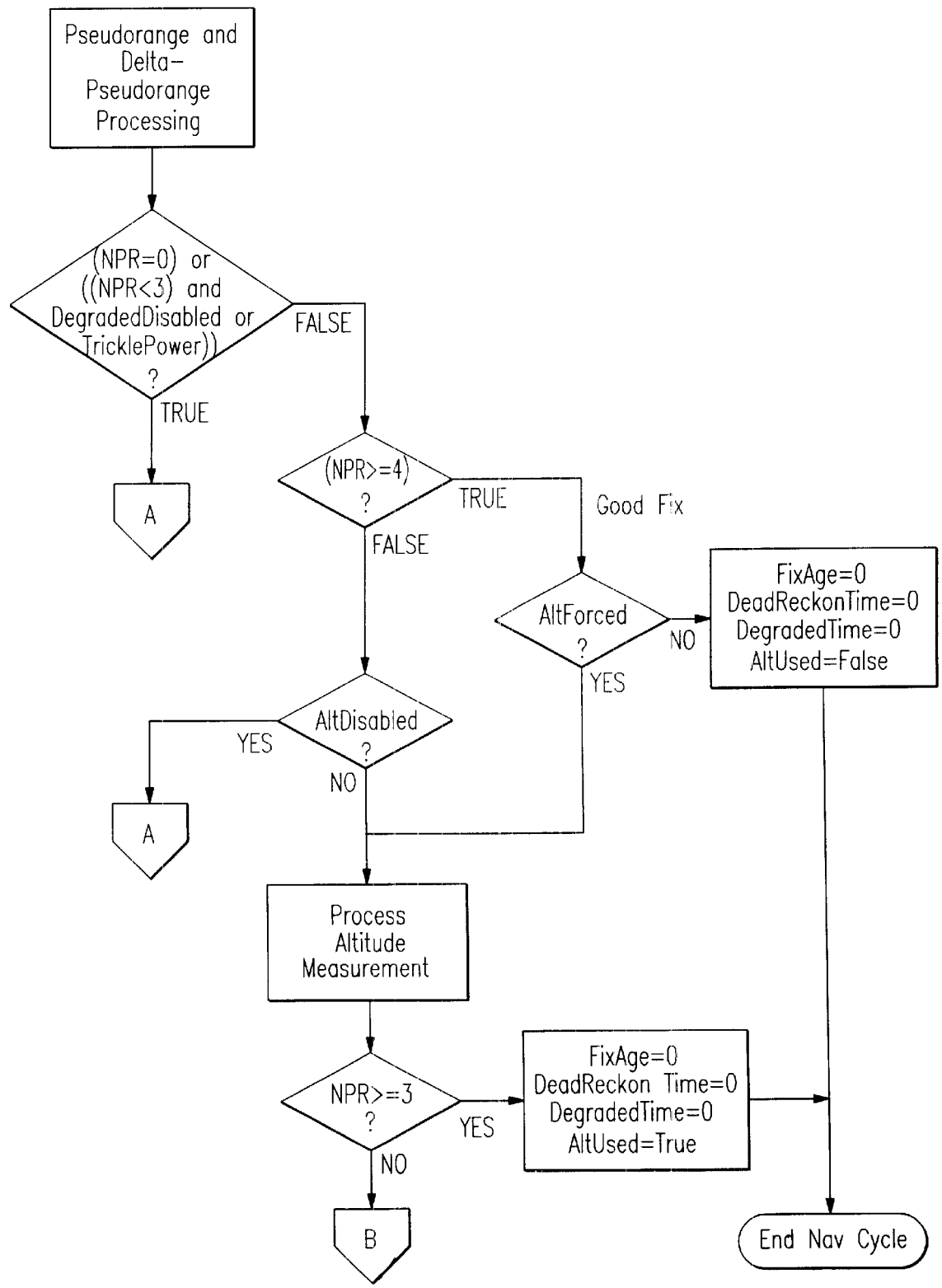
FIGS. 6A, B, and C are the degraded mode logic for SATPS receiver.
Figure 6B:
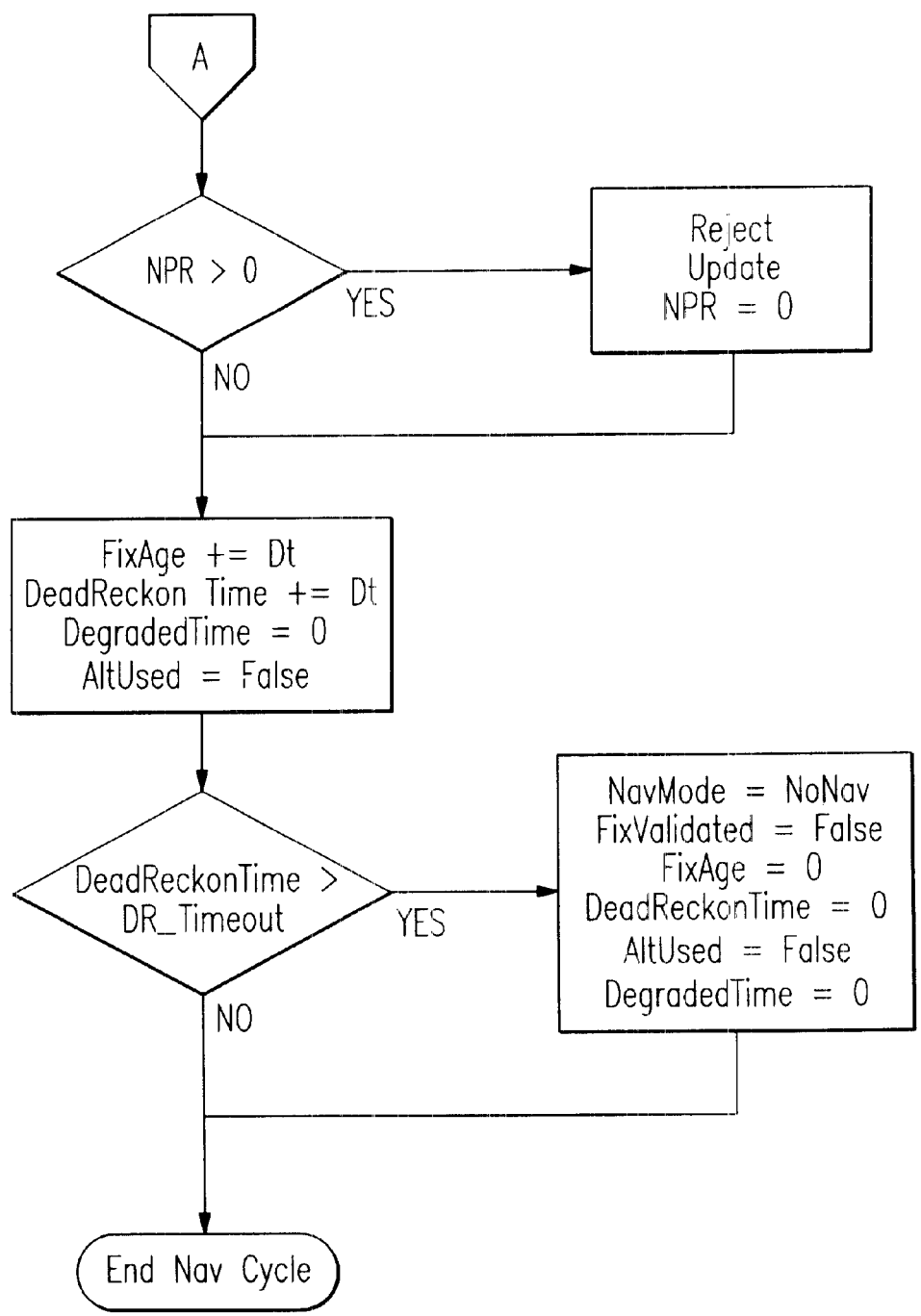
Figure 6C:
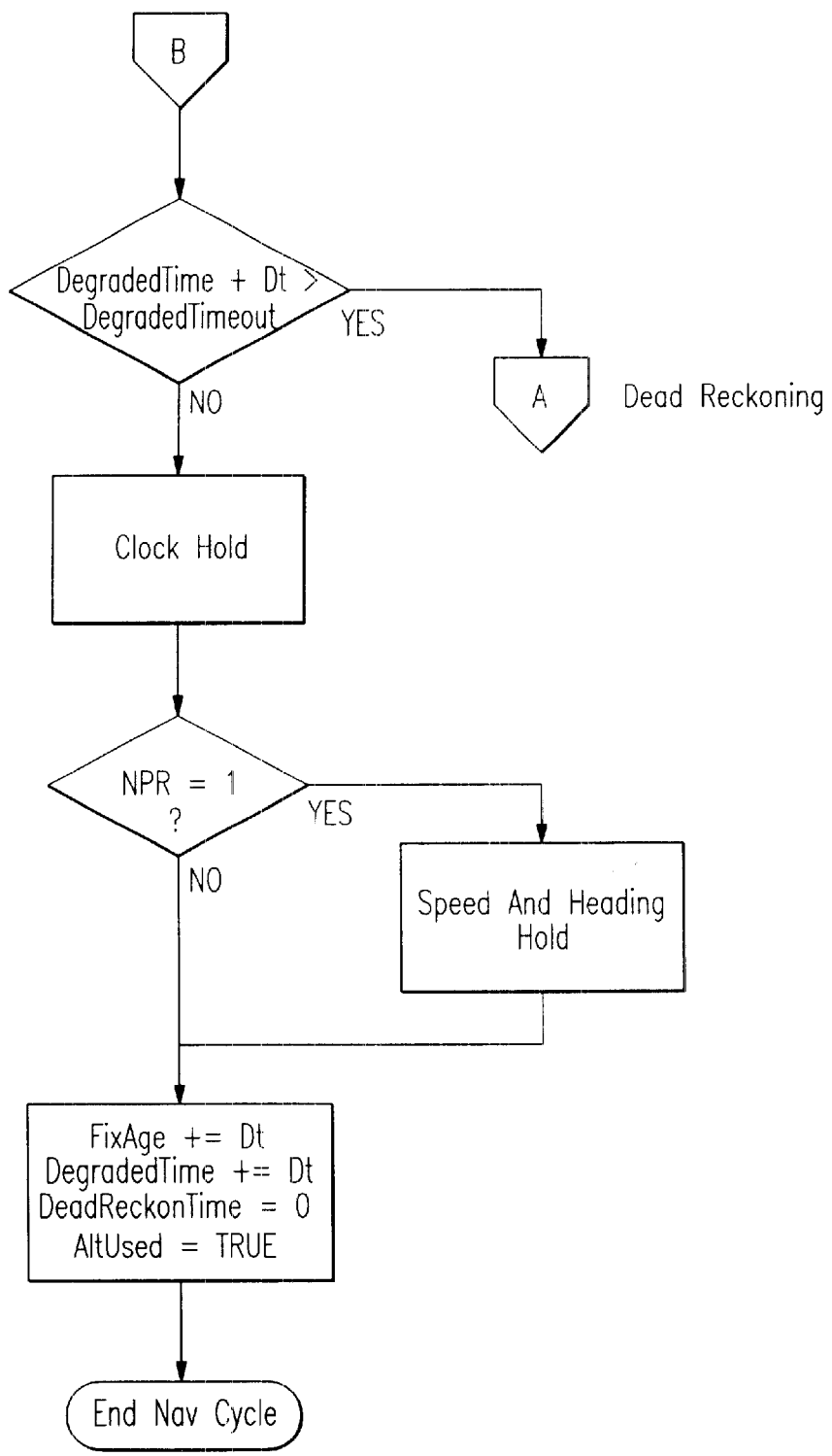
Figure 7:
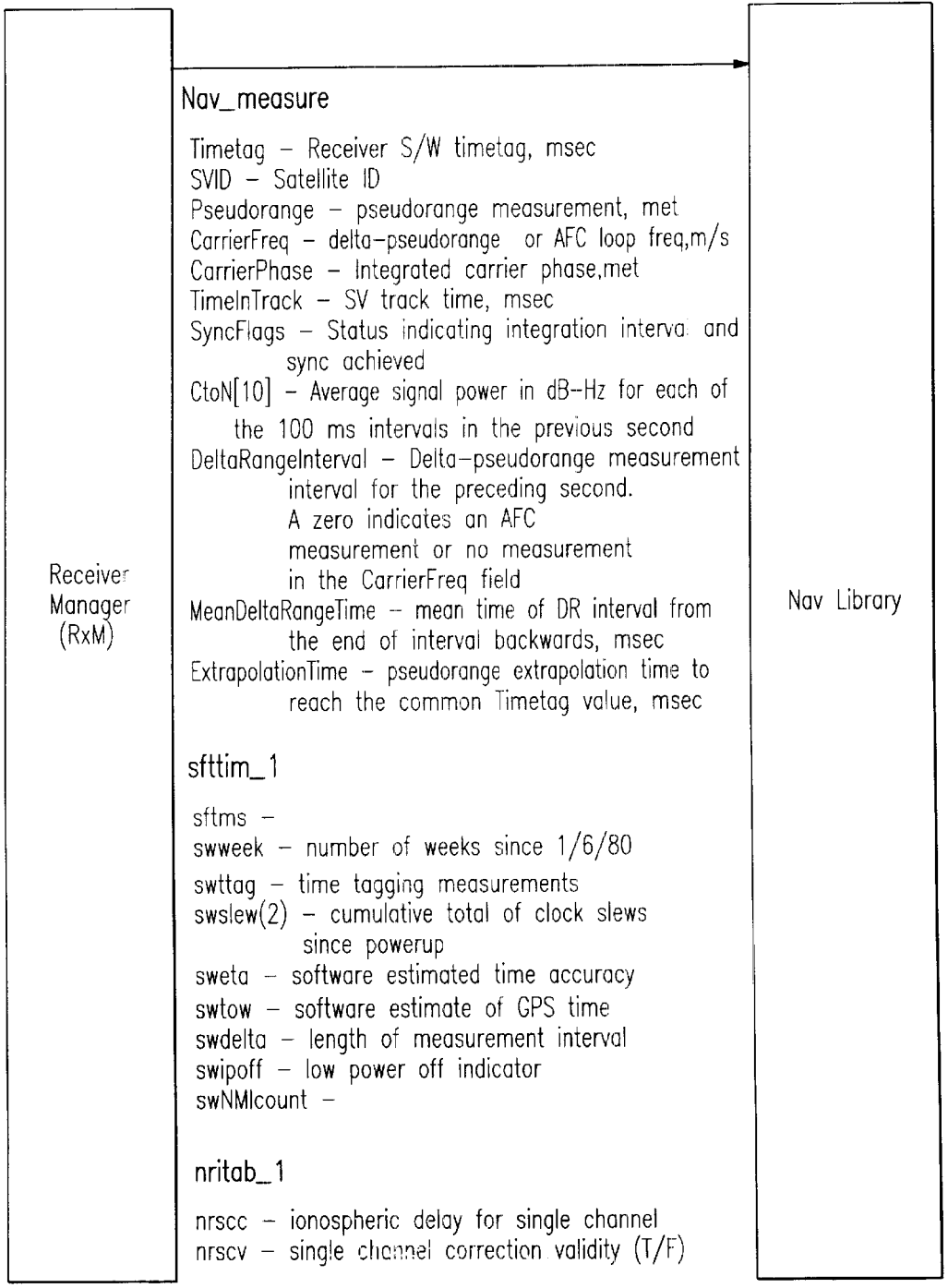
FIG. 7 is the Receiver Manager to Navigation Library Interface.
Figure 8A:
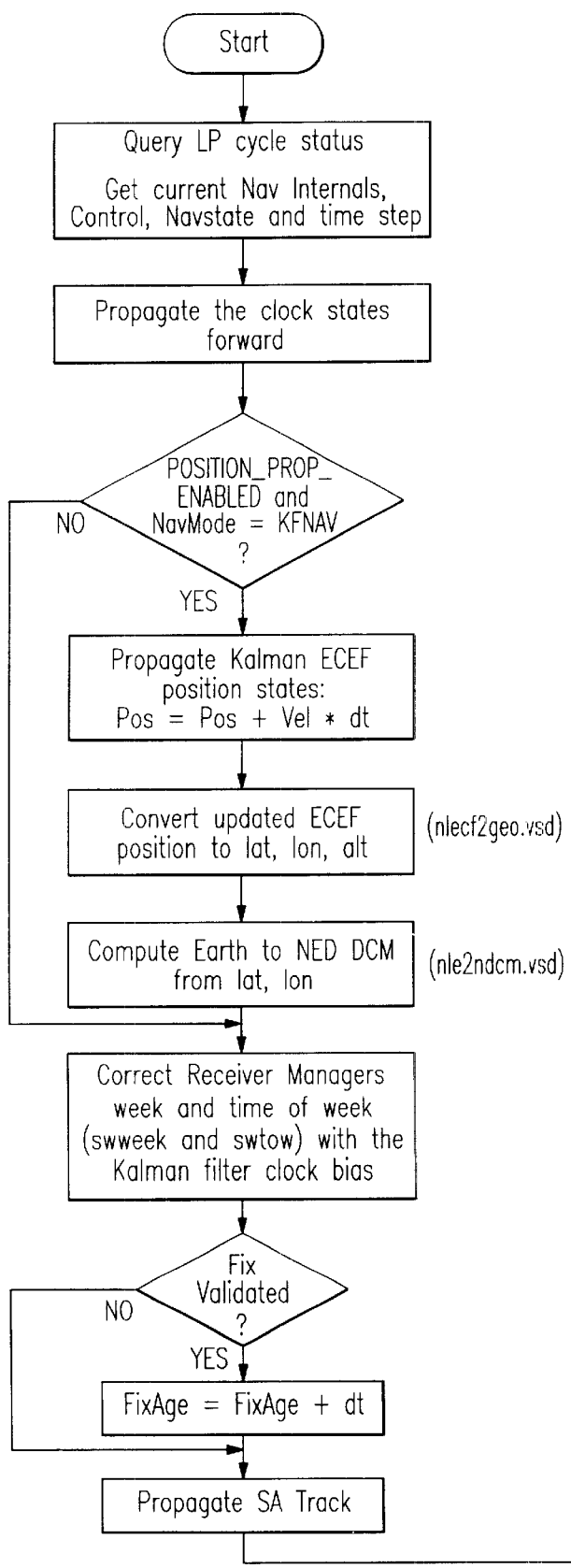
FIGS. 8A through 8G is the flowchart for the main one-hertz navigation processing loop.
Figure 8A:
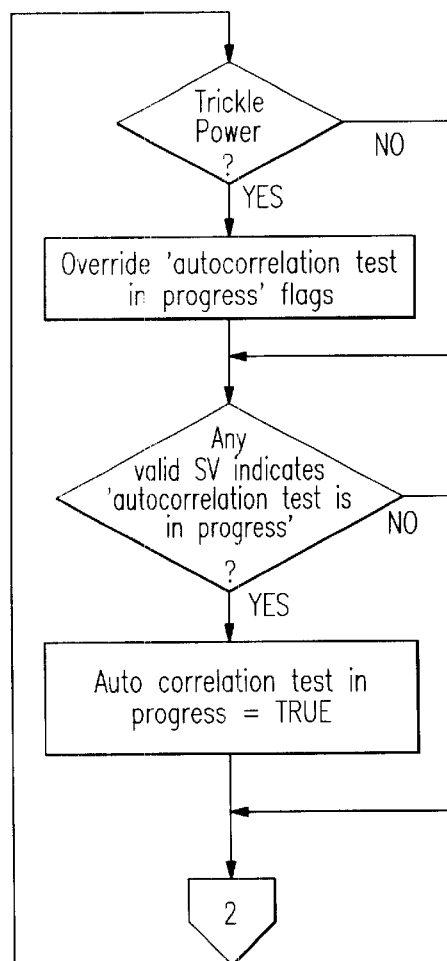
Figure 8B:
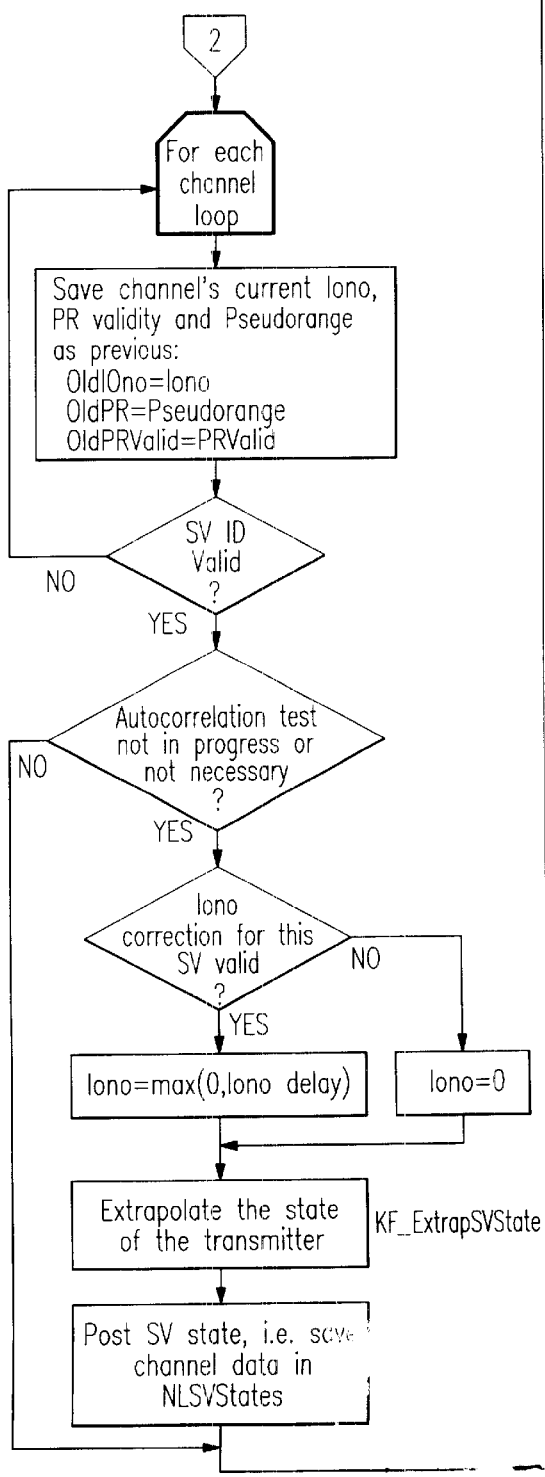
Figure 8B:
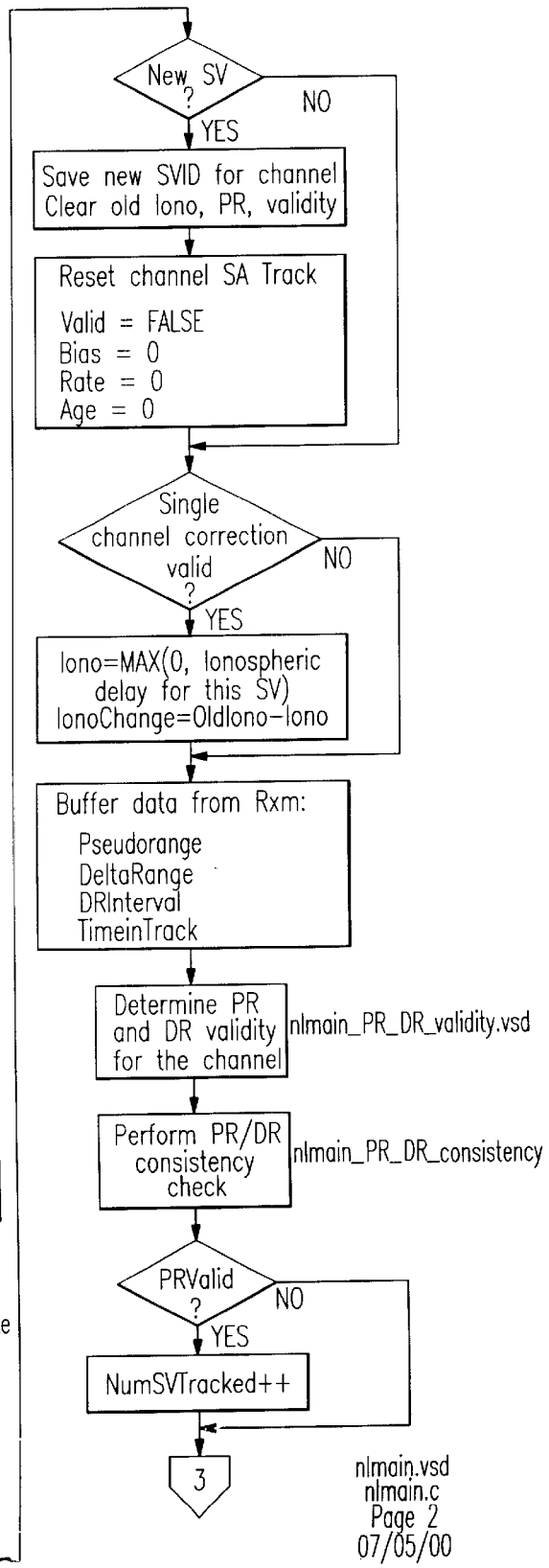
Figure 8C:
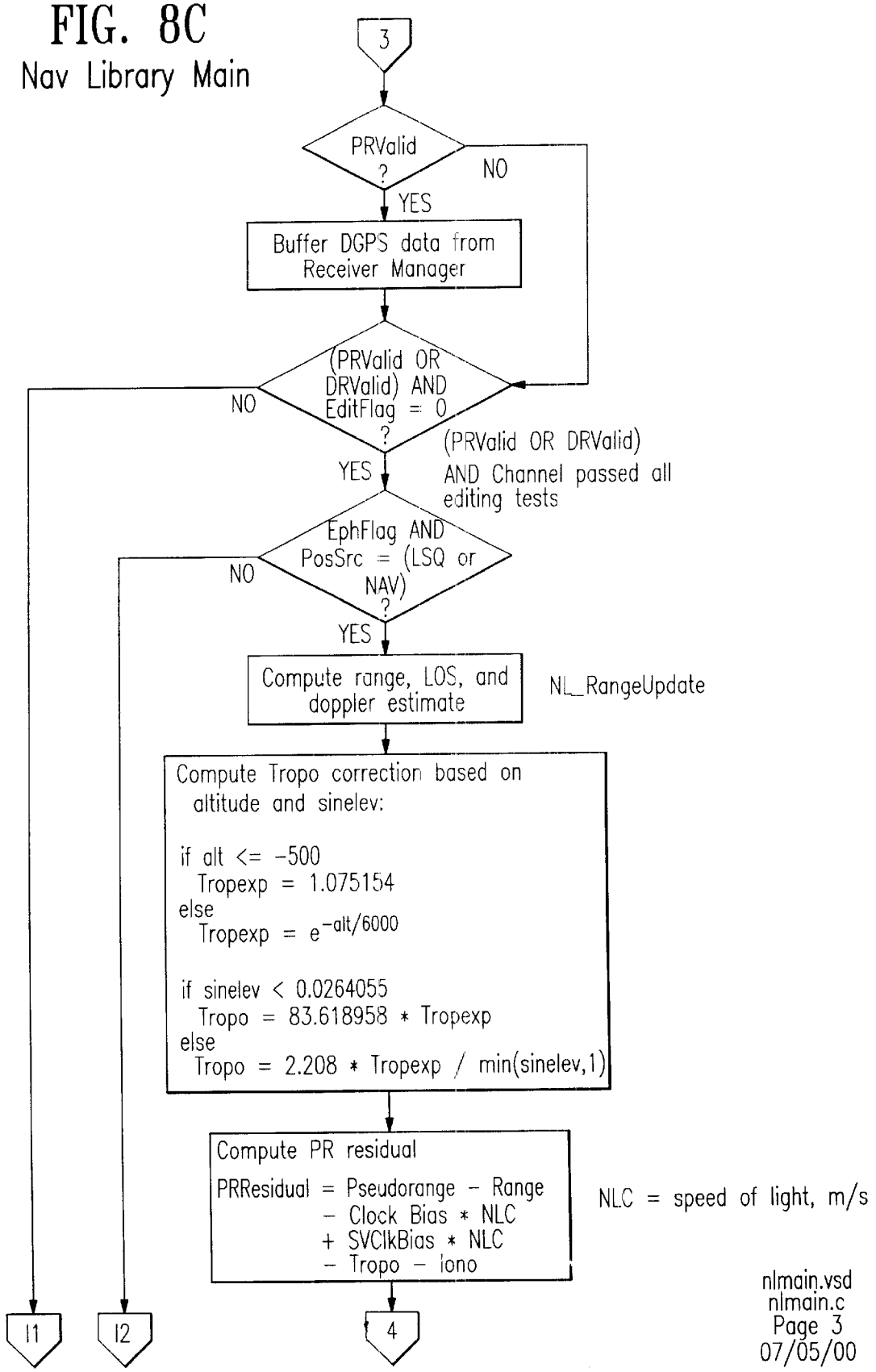
Figure 8D:
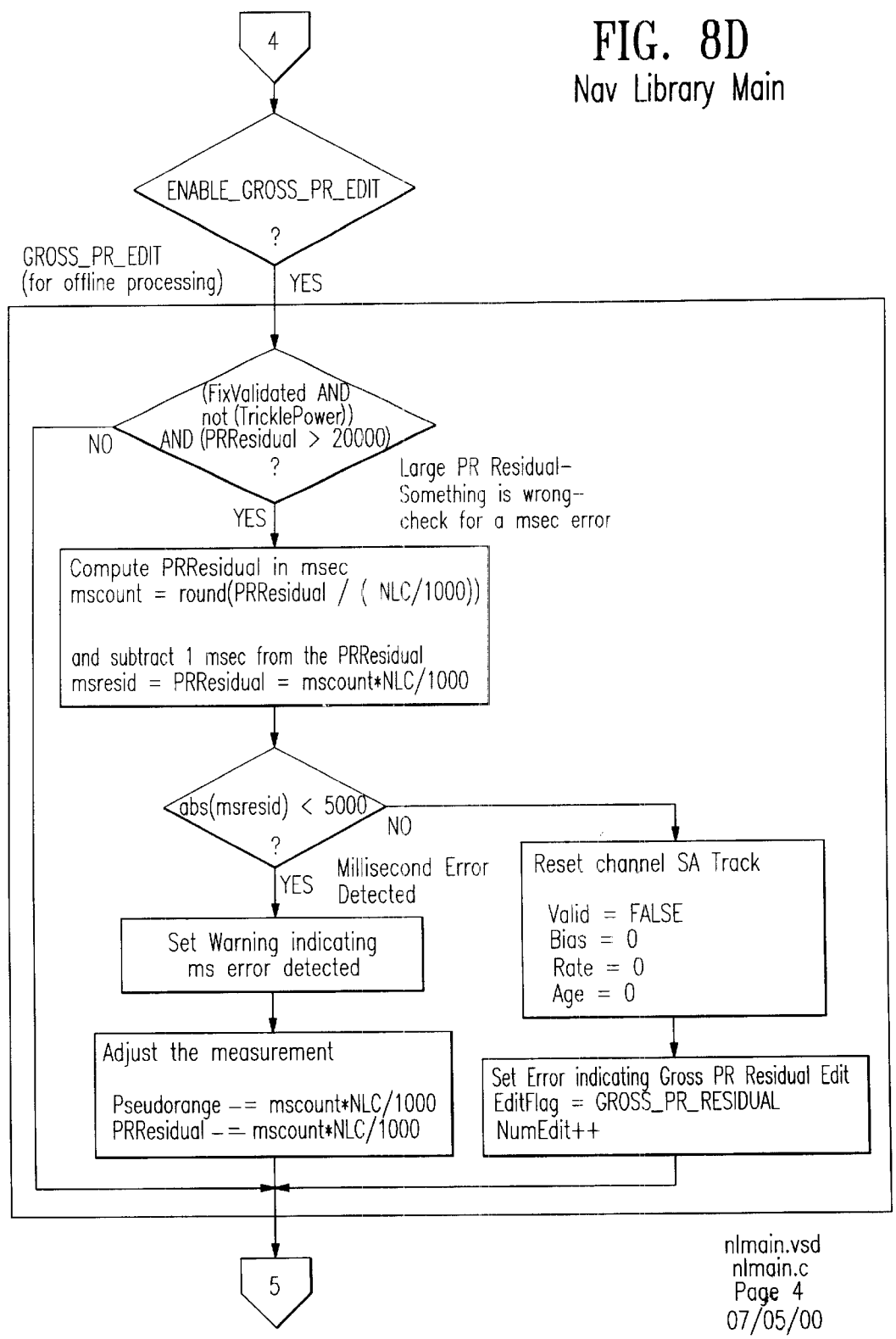
Figure 8E:
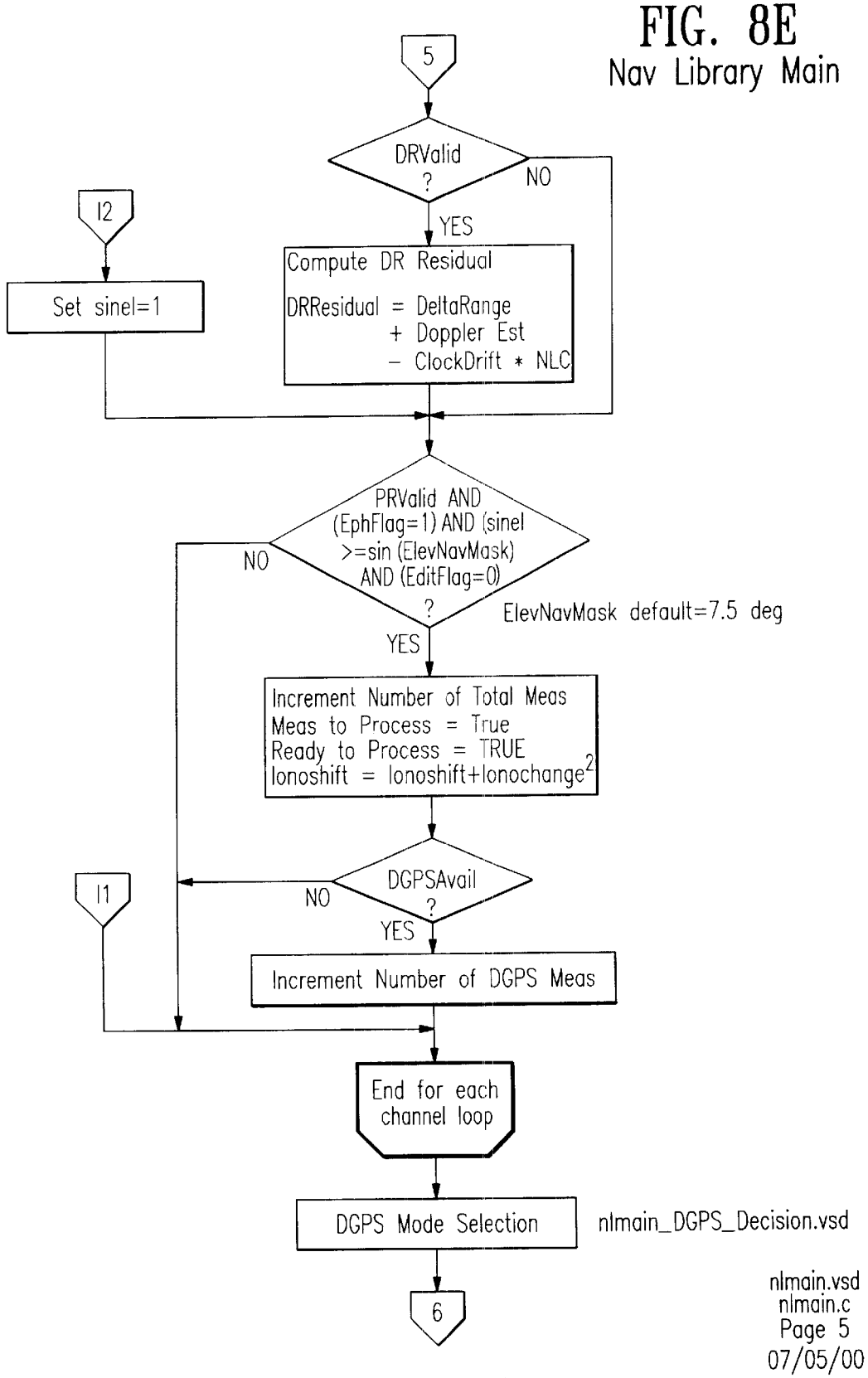
Figure 8F:
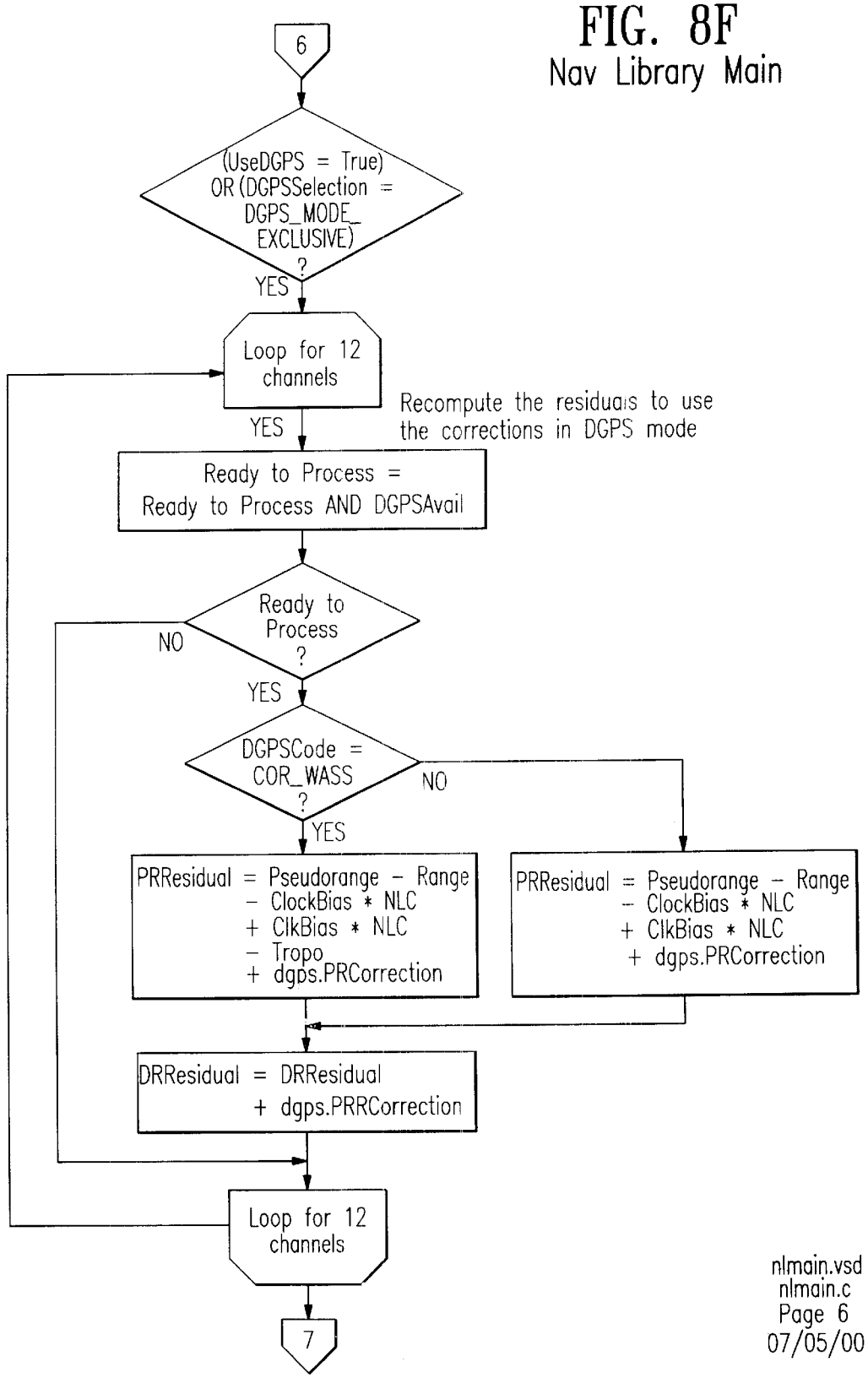
Figure 8G:
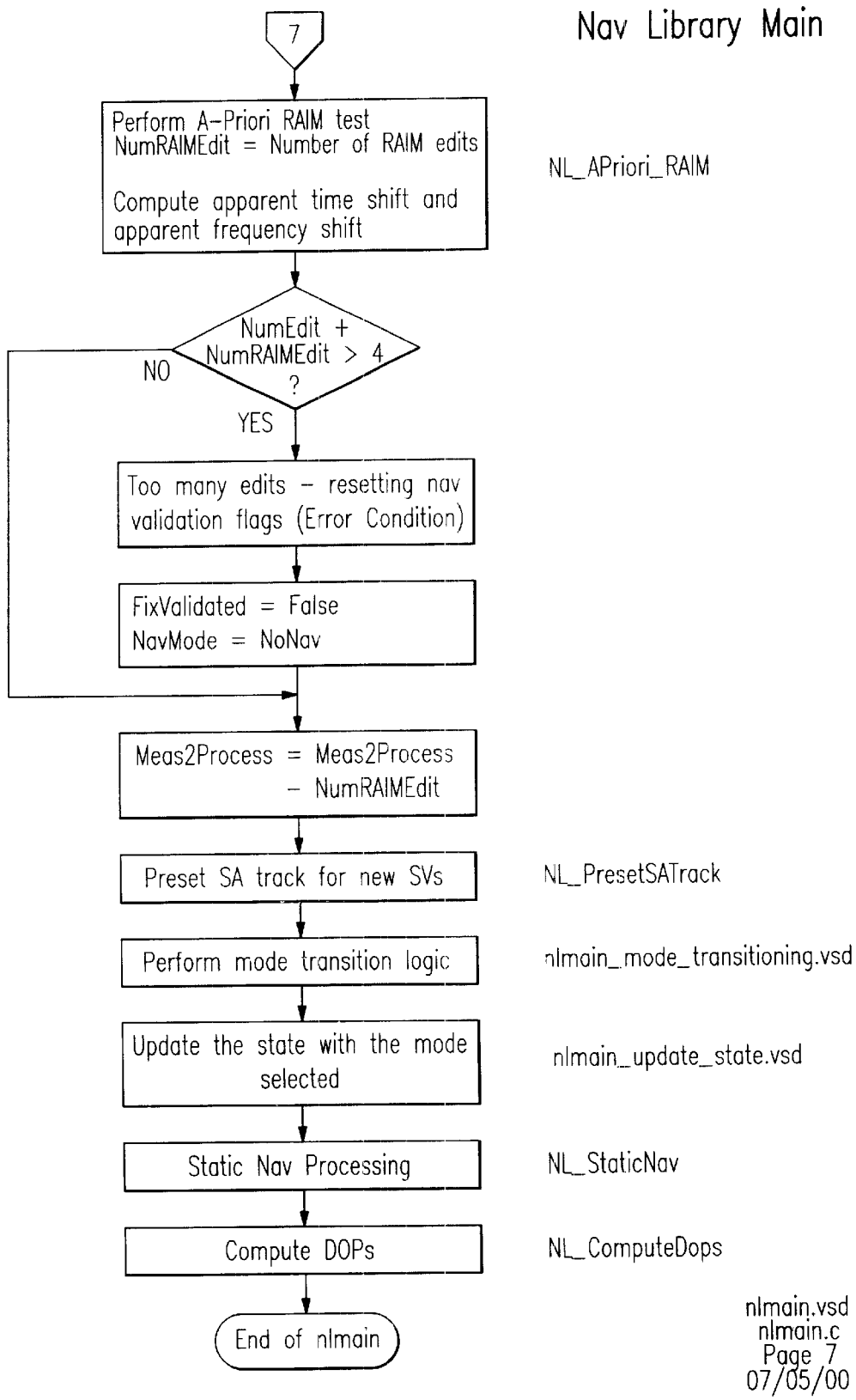
Figure 9:
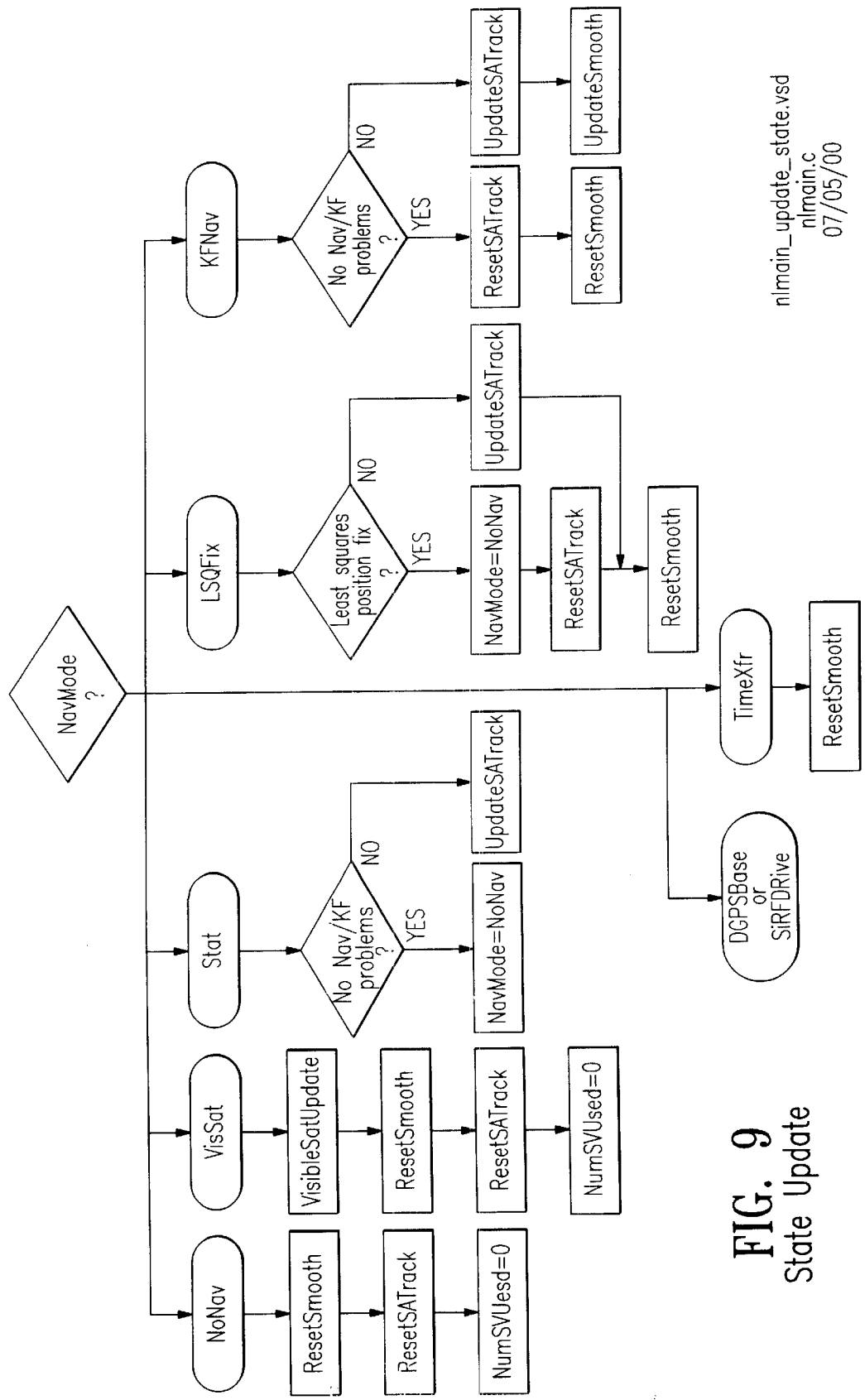
FIG. 9 Shows the navigation mode decision with an overview of the processing in each mode.
Figure 10:
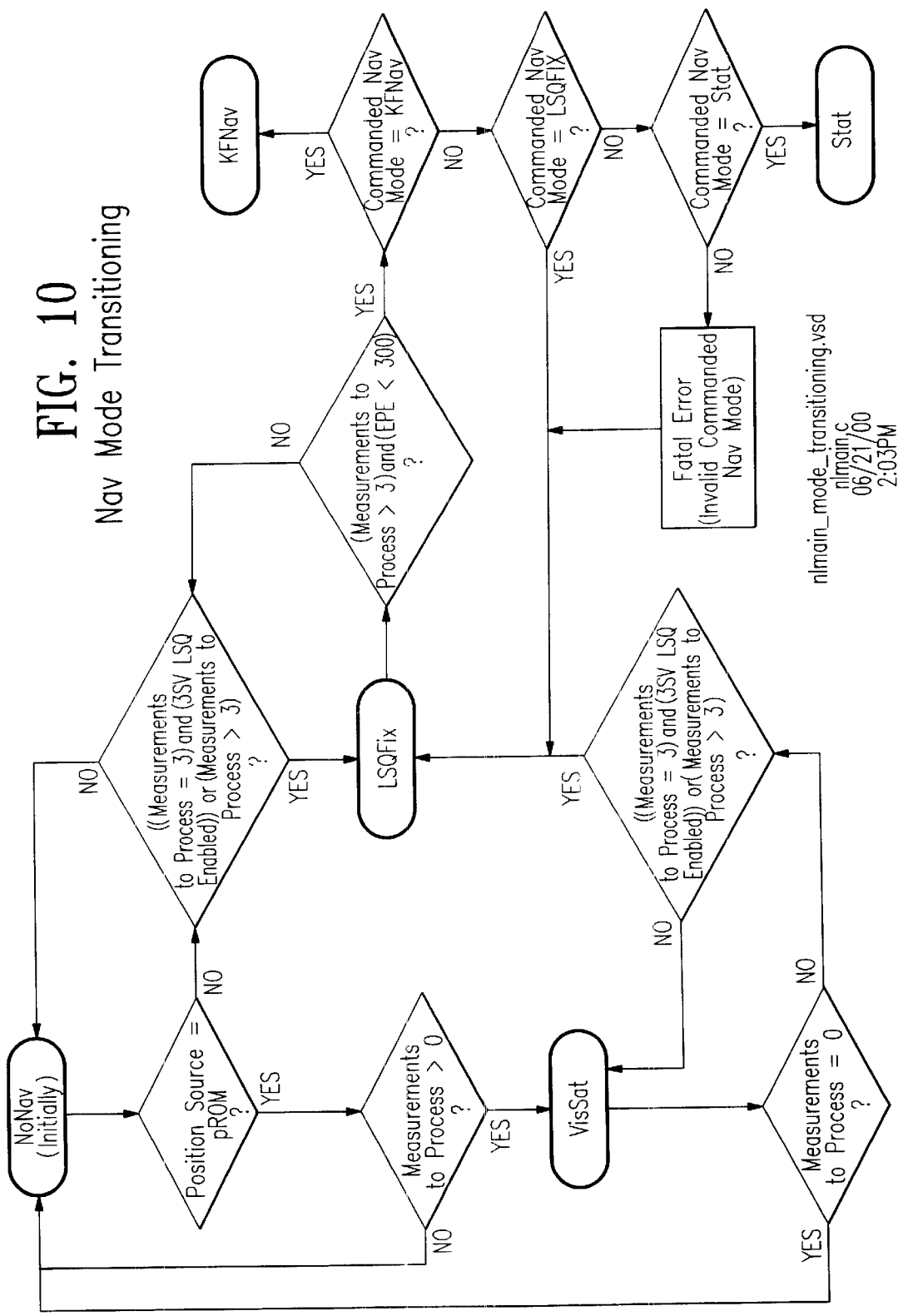
FIG. 10 is a flowchart of the mode decision logic for the main navigation loop.

One of the novel test concepts utilized was the creation of an adaptive power mask. The basic power mask test is a check on the carrier to noise density, or $C/N_0$ that the signal was tracked at to insure a reasonable prospect that the measurement is valid. This basic test has been modified to make it adaptive in two ways, as shown in FIG. 4. First, the threshold power level is adapted to the current navigation mode. If the SATPS receiver is navigating, there are a number of subsequent measurement validity checks that will be performed, so it is reasonable to lower the power threshold in the validity test to attempt to maintain the largest possible number of available good measurements. If, however, the receiver is not navigating, the power threshold is kept higher to prevent measurements with errors from getting into the initial solution. The second adaptation mechanism is to vary the form of the test between an average and minimum power test. The average power test is less restrictive, will allow more measurements, and has increased reliance on subsequent testing to find measurement errors. The minimum power test is more restrictive, requiring that all of the 100 millisecond bins used to generate the measurement have power levels above the threshold. Since the 100 millisecond estimate of $C/N_0$ is noisy, this test will result in the occasional rejection of measurements from signals near the threshold from $C/N_0$ estimate noise alone, but this is a reasonable trade-off to make against the risk of a measurement with large errors being used in the initial navigation fix.

Following the loop defined in FIG. 4 the set of valid pseudoranges above the power threshold has been identified. The set of valid delta-pseudoranges are identified as those coming from the same measurement channels as the valid pseudoranges with the additional criteria that the coherent integration time for the carrier signal be non-zero.

A test is performed on the absolute value of the differences in the delta-pseudoranges. This test is independent of the current navigation mode and can be applied without any knowledge of the SATPS receiver's position, the time, or the oscillator frequency error. In this test, the difference between to delta-pseudorange measurements is compared to the absolute physically possible limit for a terrestrial user given the constellation of satellites in use by the SATPS. In the current GPS orbits, for example, the maximum doppler to a stationary terrestrial user is about 800 m/s, so that the maximum doppler difference, observed between two satellites tracked simultaneously, must be less than approximately 1600 m/s. User velocity, taken to be a small number relative to these satellite dopplers, does not change the limit substantially because a significant user velocity towards one satellite would be substantially away from another satellite which was far enough away (in azimuth to the receiver) to be close to the limit. Thus all available differences of valid delta-pseudoranges are computed and compared to the 1600 m/s threshold. For any pair that violates the threshold, a counter for each of the participants in the offending difference is advanced. At the end of the check, a single bad measurement may have caused large differences in multiple pairs, but the counters will identify the culprit assuming sufficient satellites are available. If any measurement is involved in more than one bad difference, it is rejected, and if no bad measurement, for example, with two valid delta-pseudoranges with a bad difference, they are both rejected. The fault has been identified but not isolated.

A completely analogous check is made on the pseudorange measurements. For GPS, the physical range from a satellite to a SATPS which can receive the signal is limited to a range from about 20 million meters for a satellite overhead to about 26 million meters on the horizon. Without reference to the navigation state, the time of day, or any other state estimate, an absolute check on pseudorange measurements can be performed. No two GPS pseudoranges recorded at the same time for a terrestrial STAPS receiver can differ by more than 6 million meters. Counters for bad differences are kept as in the delta-pseudorange difference check to identify faulty measurements from in a set of difference checks.

Low-Power Measurement Processing

In low-power processing the reference oscillator is turned-off between measurement updates to save power. As a result, substantial oscillator dynamics, due to heating, are present in each set of measurements. These reference oscillator dynamics adversely affect normal processing of the delta-pseudorange measurement in a Kalman filter because of their unmodeled character. The filter must assign these unmodeled accelerations to either the clock drift term or velocity terms in it's state update, and errors are inevitable. In order to work around this problem, differenced delta-pseudorange measurements are processed instead of the whole delta-pseudorange. This limits the observability of clock drift in the filter and results in substantially better velocity estimates than would be otherwise obtainable.

Conclusion

A novel method for navigation processing in a satellite positioning system receiver has been disclosed.

A method in accordance with the present invention comprises separating the three SATPS satellites into a first pair and a second pair, constructing a primary solution and an alternate solution, wherein the primary solution and the alternate solution satisfy the measurement constraints, computing a Doppler difference estimate for the primary solution and a Doppler difference estimate for the alternate solution, computing Doppler difference residuals for the first pair and the second pair of SATPS satellites, and comparing the Doppler difference residuals for said primary and alternate solutions to determine a valid solution. Typically, the computing of a Doppler difference residuals comprises differencing a measured Doppler difference from an estimated Doppler difference for the first pair and the second pair of SATPS satellites. Typical determination of a valid solution comprises comparing the difference between the Doppler difference residuals to a predetermined number. Usually when the Doppler difference residuals exceed the predetermined number, the alternate solution is selected as the valid solution.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims appended hereto.

What is claimed is:

1. A method of verifying the validity of a SATPS three satellite solution, comprising:

separating the three SATPS satellites into a first pair and a second pair;

constructing a primary solution and an alternate solution, wherein the primary solution and the alternate solution satisfy the measurement constraints;

computing a Doppler difference estimate for the primary solution and a Doppler difference estimate for the alternate solution;

computing Doppler difference residuals for the first pair and the second pair of SATPS satellites; and comparing the Doppler difference residuals for said primary and alternate solutions to determine a valid solution.

2. The method of claim 1, wherein the computing of a Doppler difference residuals comprises differencing a measured Doppler difference from an estimated Doppler difference for the first pair and the second pair of SATPS satellites.

3. The method of claim 2, wherein the determination of a valid solution comprises comparing the difference between the Doppler difference residuals to a predetermined number.

4. The method of claim 3, wherein when the Doppler difference residuals exceed the predetermined number, the alternate solution is selected as the valid solution.

5. A method of verifying the validity of a SATPS three satellite solution, comprising:

separating the three SATPS satellites into a first pair and a second pair;

constructing a primary solution and an alternate solution, wherein the primary solution and the alternate solution satisfy the measurement constraints;

computing a Doppler difference estimate for the first pair and the second pair of both the primary and alternate solutions;

computing Doppler difference residuals for the first pair and the second pair of SATPS satellites in each solution by subtracted measured doppler differences from the doppler difference estimates; and comparing the Doppler difference residuals for said primary and alternate solutions to determine a valid solution.

* * * * *